2,434,884

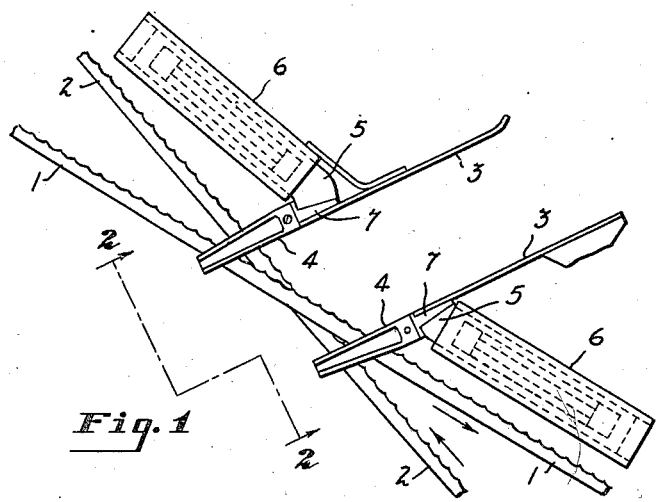
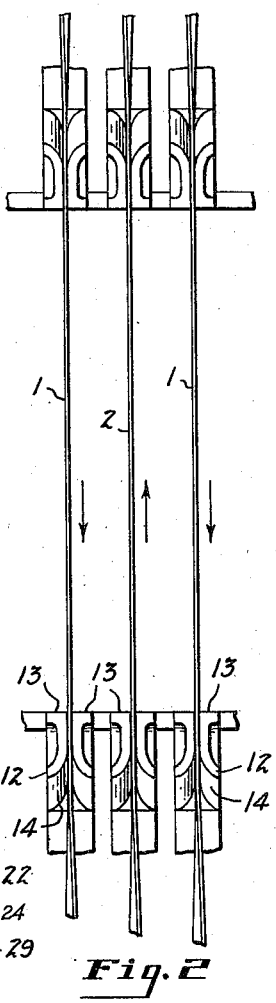
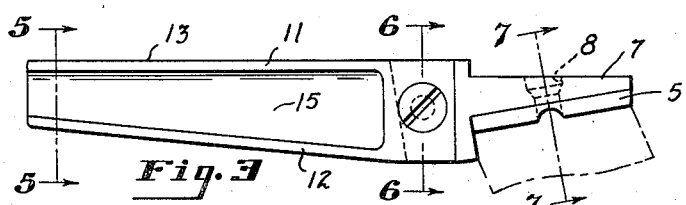
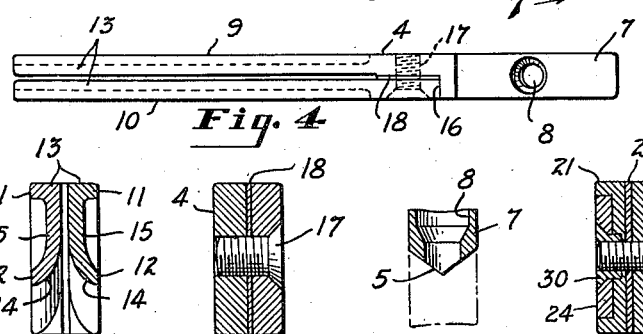
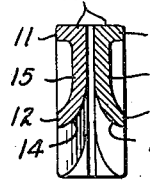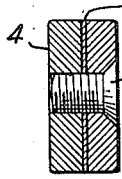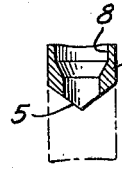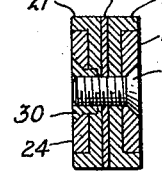
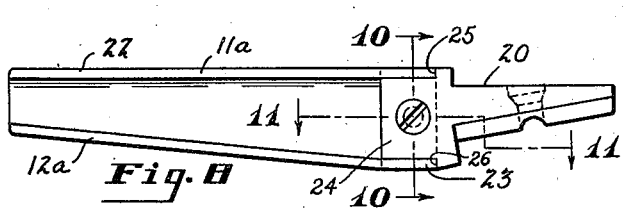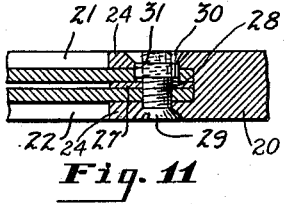
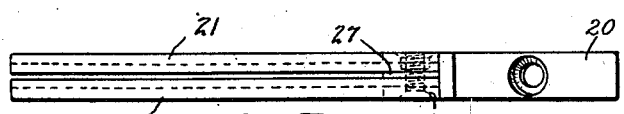
INVENTORS
Arthur A. Kottmann
Fred Rohlfing
BY Evans + McCoy
ATTORNEYS Patented Jan. 20, 1948

UNITED STATES PATENT OFFICE 2,434,884

BAND BLADE GUIDE

Arthur A. Kottmann and Fred Rohlfing, Davenport, Iowa, assignors to The Bettendorf Company, Bettendorf, Iowa, a corporation of Maryland Application June 28, 1945, Serial No. 602,072

5 Claims. (Cl. 146—88)

1

This invention relates to bread slicing machines of the band blade type and more particularly to the band blade guides that straighten and guide the twisted crossing blades of such machines adjacent the points where the blades cross and that also serve to guide the bread loaves across the crossing blades.

The invention has for its object to provide blade guides which are so formed that wear on the guides and upon the slicer blades is lessened.

A further object is to so form blade guides that are adjustable to vary the thickness of slices that accumulations of crumbs between the guides will not interfere with adjustments of the guides.

An additional object is to provide easily replaceable guides for individual slicer blades, each comprising a carrier and a pair of fingers detachably and rigidly fastened to the carrier.

With the above and other objects in view, the invention may be said to comprise blade guides as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Fig. 1 is a fragmentary side elevation of the bread slicing machine embodying the invention.

Fig. 2 is a fragmentary rear elevation of the slicer viewed as indicated at 2—2 in Fig. 1;

Fig. 3 shows a guide in side elevation;

Fig. 4 is a top plan view of the guide;

Fig. 5 is a section taken on the line indicated at 5—5 in Fig. 3;

Fig. 6 is a section taken on the line indicated at 6—6 in Fig. 3;

Fig. 7 is a section taken on the line indicated at 7—7 in Fig. 3;

Fig. 8 shows a guide of modified construction in side elevation;

Fig. 9 is a top plan view of the guide shown in Fig. 8;

Fig. 10 is a section taken on the line indicated at 10—10 in Fig. 8, and

Fig. 11 is a section taken on the line indicated at 11—11 in Fig. 8.

The device of the present invention is applied to a bread slicing machine having twisted crossing blades 1 and 2 which run in opposite directions, the blades being endless bands passing over cylindrical drums and twisted to cross between the drums. Since the crossed blade slic-

2 ing machine is a well known type, the drums over which the blades 1 and 2 run have not been shown. Loaves to be sliced are delivered to the crossing portions of the blades through a guideway 3 that terminates in upper and lower sets of blade guides 4 that form continuations of the guideway for directing the loaves past the slicer blades, the guides 4 having suitable blade receiving slots for straightening the blades and guiding the portions thereof passing through the bread loaves. Each blade guide 4 receives a single blade and is attached to a carrier 5 forming part of a blade adjusting mechanism 6 by means of which the carriers and guides may be simultaneously adjusted to vary the spacing of the guides. The particular form of blade adjusting mechanism employed is not of importance in so far as the present invention is concerned, but may be a mechanism such as described in the Kottmann et al. Patent 2,297,710, granted October 6, 1942.

Each guide 4 has a shank portion 7 for attachment to a carrier 5 that is provided with a screw hole 8. Each guide has fingers 9 and 10 spaced apart to straddle a blade, the fingers preferably tapering from their inner attached ends to their outer ends and being channel shaped in cross section. The fingers 9 and 10 are arranged back to back with their channels facing outwardly, the channels being formed between flanges 11 and 12 at the inner and outer edges of the fingers. The inner flanges 11 are disposed at right angles to the body portion of the finger and have flat external faces 13 upon which loaves of bread are guided. The outer flanges 12 are obtuse single flanges with curved outer faces 14. The inner portions 15 of the inner faces of the fingers are flat and parallel to guide the portions of the blades extending across the loaf guideway and to hold these portions of the blade against twisting. The flange faces 14 form flaring outer portions for the blade guideway which cause blades entering the guideway to be gradually straightened and which permit the gradual twisting of blades passing out of the guide.

As shown in Figs. 5 to 7, the finger 9 may be formed integrally with the shank 7 and the finger 10 detachably secured to finger 9. A positioning shoulder 16 is formed on the shank alongside the inner end of the finger 9 against which the inner end of finger 10 is seated, and the finger 10 is secured to the finger 9 by means of a screw 17. The desired spacing of the fingers is obtained by means of a shim 18 interposed between the inner ends of the fingers, the shim being held in place by the screw 17 which passes through the fingers and shim. The spacing of the inner portions of the fingers 9 and 10 is slightly greater than the thickness of the slicer blade and parallel faces of the fingers serve to hold the portion of the blade passing through the loaf guideway against twisting movements.

By providing the flaring faces 14 at the outer edges of the slots, the blades entering the slots through the flaring portions are gradually guided from their twisted to a straight position and the blades passing out through the flaring portions of the slots are permitted to flex laterally before they leave the guide slots. This flaring mouth slot construction reduces the pressure between the faces of the blades and the faces of the guide members and reduces the wear on both the blades and the guide fingers.

Where adjustable blade guides are provided with flat side faces, crumbs compressed between the guides are likely to adhere to the faces of the guide and to accumulate to an extent such that they prevent the guides from being moved close together. By providing channels in the outer faces of the guides and leaving these channels open at the outer ends of the guides, pockets are provided for the crumbs in which the crumbs can accumulate and gradually pass down toward the open outer ends of the guide fingers. This prevents the crumbs from being mashed against faces of the guide fingers and avoids the formation of glutinous accumulations which interfere with adjustment of the blades.

In Figs. 8 to 11 of the drawings, a slightly modified form of guide is shown. In this form a shank 20 has two identical fingers 21 and 22 attached thereto, the fingers 21 and 22 being of substantially the same cross sectional shape as the fingers 9 and 10 and being provided with edge flanges 11a and 12a corresponding to the flanges 11 and 12. In this modification however the flanges 11a and 12a extend the full length of the fingers and the flange 12a has an inner end portion 23 parallel to the inner flange 11a. The shank 20 has spaced projecting flanges 24 to which the fingers 21 and 22 are attached. The fingers are inserted between the flanges 24 with the flanges 24 fitting within the inner ends of the channels in the outer faces of the fingers and with the inner ends of the flanges 11a and 12a engaging shoulders 25 and 26 formed on the shank 20.

A spacing shim 27 may be placed between the fingers 21 and 22 and the fingers may be secured in place by means of a bolt 28 having a head 29 that seats in a countersink in one of the flanges 24 and a nut 30 that seats in the countersink in the other flange 24. A nut 30 may extend into an opening 31 in one of the fingers as shown in Fig. 11. When the bolt 28 is tightened flanges 24 are sprung into tight engagement with the inner ends of the fingers rigidly clamping the fingers in place.

By providing fingers detachably secured to the carriers, worn or damaged fingers can be readily replaced without disturbing the adjusting mechanism.

It is to be understood that variations and modifications of the specific devices herein shown and described for purposes of illustration, may be made without departing from the spirit of the invention.

What we claim is:

1. In a bread slicing machine having twisted crossing blades that travel in opposite directions, a loaf guideway comprising a plurality of blade guides disposed on opposite sides of the crossing points of the blades, said guides having flat inner loaf guiding faces and parallel blade receiving slots, the opposite sides of each slot being flat and parallel adjacent the flat inner face of the guide and spaced apart a distance but slightly greater than the thickness of the blades to provide relatively close clearance between the guides and the blades, said slots having flaring outer portions forming tapering guide surfaces for the entry or exit of the twisted blades, the opposing faces of adjacent guides being shaped to provide registering longitudinal crumb channels, each occupying the major portion of the width of the guide and being open at its outer end to facilitate discharge of crumbs by gravity.

2. In a bread slicing machine having twisted crossing blades that travel in opposite directions, a downwardly inclined loaf guideway comprising a plurality of blade guides disposed on opposite sides of the crossing points of the blades, each guide comprising a carrier mounted for relative lateral adjustment and a pair of detachably connected fingers secured at their upper ends to the carrier and adapted to straddle a band blade with relatively narrow clearance, each finger having edge flanges forming a longitudinal channel in its outer face that is open at its lower end.

3. In a bread slicing machine having twisted crossing blades that travel in opposite directions, a downwardly inclined loaf guideway comprising a plurality of blade guides disposed on opposite sides of the crossing points of the blades, each guide comprising a carrier mounted for relative lateral adjustment and a pair of fingers that are channel shaped in cross section, secured at their upper ends to said carrier back to back to provide a blade guiding slot to receive a blade with relatively narrow clearance, the outer edges of the flanges of the channels lying in the planes of the side faces of the carriers, and the channels being open at the lower ends of the fingers.

4. In a bread slicing machine having twisted crossing blades that travel in opposite directions, a downwardly inclined loaf guideway that includes a plurality of adjustably mounted blade guides mounted on opposite sides of the crossing points of the blades, each guide comprising a carrier and a pair of fingers detachably secured to the carrier and adapted to straddle a band blade, each of said fingers having flanges along opposite sides thereof that form a channel in its outer face that is open at the lower end of the finger, one flange being a right angled flange with a flat outer face and the other an obtuse angled flange with a curved outer face, said fingers being secured to the carrier back to back with the right angled flanges facing the crossing point of the blades to form a loaf guideway.

5. In a bread slicing machine having twisted crossing band blades that travel in opposite directions, a blade straightening guide disposed at a downward inclination adjacent the crossing point of the blades, said blade guide having a flat loaf guiding inner edge facing said crossing point and a blade receiving slot the opposite sides of which are flat and parallel adjacent said flat inner edge and the outer portions of which are flaring, the inner portions of the slot being of a width but slightly greater than the thickness of the blade and the outer portions of the slot forming a tapering guide for the entry or exit of a twisted blade, each outer face of said guide having flanges along its upper and lower edges extending to the lower end thereof and forming a longitudinal channel open at its lower end.

ARTHUR A. KOTTMANN.
FRED ROHLFING.

REFERENCES CITED

The following references are of record in the file of this patent:

UNITED STATES PATENTS

| Number | Name | Date |
|---|---|---|
| 2,181,233 | Hartman | Nov. 28, 1939 |
| 2,150,427 | Criner | Mar. 14, 1939 |
| 2,208,834 | Criner | July 23, 1940 |
| 2,294,927 | Niebuhr | Sept. 8, 1942 |
| 2,375,231 | Kottmann | May 8, 1945 |